United States Patent Office 2,851,474
Patented Sept. 9, 1958

2,851,474

PROCESS FOR THE PRODUCTION OF DIVINYL-DIALKOXYALKOXYSILANES

Arthur N. Pines, Snyder, and Robert E. Godlewski, Niagara Falls, N. Y., assignors to Union Carbide Corporation, a corporation of New York No Drawing. Application October 31, 1955
Serial No. 544,035

2 Claims. (Cl. 260—448.8)

This invention relates to a new polymerizable silane derivative and to a novel method for producing the same. More particularly, the invention contemplates the provision of a polymerizable, well defined alkenylsilicic ester or ether of the formulation dialkenyl-bis (alkoxyalkoxy) silane wherein the substituent groups consist of vinyl and 2-methoxyethoxy in the form, divinyl bis (2-methoxyethoxy)silane, as represented by the structural formula:

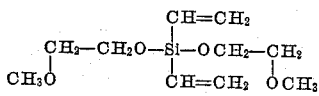

and which may be represented, also, by the formulae:

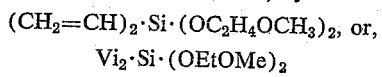

The silane derivatives containing alkenyl groups, such as the vinyl group, form a distinct class of compounds owing to the fact that they may be crosslinked through their reactive organic substituents in the formation of high molecular weight polymers. Apart from the capacity of vinyl-substituted silanes to undergo organic polymerization, these compounds are also of particular interest by reason of the fact that the reactivity of a silicon-bonded vinyl group permits the application of specialized curing techniques, other than conventional condensation procedures, to polymeric molecules containing unsaturated groups of this type, such for example, as in the preparation of silicone rubbers. Furthermore, compounds of the general class described may be employed in the production of copolymers with organic olefinic materials.

As is now well established in industry, the alkylalkoxysilane derivatives function in much the same manner as the alkylchlorosilanes in that they hydrolyze to form corresponding silicols or their dehydration products. Besides hydrolysis, the silicic esters may be reacted through their alkoxy groups with the Grignard reagent to attach organic groups directly to the silicon nucleus, and, generally exhibit a great many other reactive characteristics of the silicic halides. By far, the majority of compounds of the general class described heretofore known in industry are of the type which contain saturated hydrocarbon groups in combination with alkoxy or alkoxyalkoxy substituents. The relatively few known compounds of the same general class which contain unsaturated hydrocarbon substituents in combination with alkoxy or alkoxyalkoxy groups are either monofunctional with respect to such unsaturated substitution, as, for example, the compound vinyltris(2-methoxyethoxy)silane, or, those of multifunctional unsaturated hydrocarbon reactivity are of the type containing simple alkoxy substituents, as, for example, the compounds divinyldiethoxysilane or diallyldiethoxysilane.

In contrast to the aforementioned compound, the novel silane derivative of the present invention is difunctional with respect to vinyl reactivity and, as such, forms a highly effective crosslinking agent. Apart from this difference in vinyl functionality, the prior compound is not otherwise equivalent to or interchangeable with our compound. Thus, for example, vinyltris(2-methoxyethoxy)silane, cannot be used in the production of silicone elastomers since it is trifunctional with respect to the Si-O-linkage and such constituents are harmful to silicone gums and elastomers. On the other hand, the compound of our invention possesses known utility as an intermediate in the preparation of such compounds.

As distinguished from the compounds, divinyldiethoxysilane and diallyldiethoxysilane mentioned hereinbefore, the compound of the present invention is much more water soluble by reason of the 2-methoxyethoxy groups present therein. This characteristic is of particular importance in sizing applications where it is necessary or desirable to apply the silane to fibre or cloth by means of aqueous solutions thereof in lieu of inflammable solvents and emulsifying agents. Furthermore, as compared to prior allyl-type silane derivatives in general, the compound of the present invention is substantially more stable. That is to say, by reason of the inherent tendency of the allylic system (C=C—C) to undergo cleavage or addition polymerization under certain conditions, compounds containing this substituent are not particularly well suited to controlled polymerization reactions. Thus, silicon-bonded allyl derivatives undergo C—Si cleavage readily in the presence of alkali or acid with even trace amounts of water, yielding a siloxane and a hydrocarbon. In the absence of water, cleavage or allylic polymerization occurs readily in the presence of alkali or acid. On the other hand, the silicon-vinyl bonds of the compound of the present invention are stable under such conditions.

The compound of the invention is useful as a multifunctional vinyl-containing silane which can be equilibrated with $(Me_2SiO)_n$ to yield a vinyl-modified polymer for silicone elastomers, or with siloxanes in general to yield vinyl-modified polymers. In addition, our compound may be employed as a sizing agent, or in the formation of copolymers with organic monomers or polymers. As pointed out hereinbefore, the presence of the 2-methoxyethoxy groups within the compound of the invention makes it substantially more water soluble than the simple ethoxy-substituted esters known heretofore, and renders the compound particularly useful for sizing applications from aqueous systems.

In accordance with heretofore customary procedures, the alkylsilicic esters are formed by the reaction of alkylchlorosilanes with alcohols, or from the orthosilicates by direct reaction with zinc alkyls or with the Grignard reagent. Alternatively, the dialkyldialkoxysilanes and many of the alkyltrialkoxysilanes are formed by a modified Grignard reaction without the use of ether as a solvent (U. S. Patent No. 2,380,057). In accordance with a preferred process of the present invention, we obtain the novel compound divinyl bis (2-methoxyethoxy) silane by transesterification and disproportionation of vinyltriethoxysilane [ViSi(OEt)$_3$], and methyl "Cellosolve"[methoxyethanol-MeO(CH$_2$)$_2$OH], in the presence of a potassium hydroxide catalyst, followed by distillation for recovery of the pure product. Alternatively, we have found that the compound may be prepared by disproportionation of the monovinyl functional compound, vinyl-tris (2-methoxyethoxy) silane, also, in the presence of potassium hydroxide. In line with conventional techniques, the compound may also be prepared by reaction of divinyl-dichlorosilane with 2-methoxyethanol.

A rather unique and unexpected further distinction between the silicon-ethoxy type compounds such as divinyl-diethoxysilane, and the silicon-methoxyethoxy compound of the present invention is demonstrated by the fact that whereas our compound may be prepared by disproportionation of vinyl-tris (2-methoxyethoxy) silane in the presence of alkali as pointed out above, the compound divinyldiethoxysilane cannot be obtained in this manner from vinyltriethoxysilane.

The invention may be best understood by reference to the following specific examples of typical preparations and recoveries of the compound of the invention by the unique syntheses summarized above:

EXAMPLE I

Preparation of:

divinyl bis (2-methoxyethoxy) silane

(Transesterification and disproportionation)

24 moles of vinyltriethoxysilane [ViCi(OEt)$_3$], 96 moles of methyl "Cellosolve" [CH$_3$OC$_2$H$_4$OH], and 10 grams of a potassium hydroxide catalyst were reacted by transesterification. The resulting mixture was heated to reflux, using a 2-inch diameter by 36-inch high column packed with ¼-inch glass helices. Ethanol, in amount of 3762 grams was distilled out, including a trace of the methyl Cellosolve. The kettle temperature ranged from 120–130° C. to 152° C. at the end of distillation.

The pressure was reduced to 15 mm. and 469 grams of product were distilled at 145° C. Redistillation yielded 240 grams of divinyl bis (2-methoxyethoxy) silane of boiling point 90–92° C. at 4 mm. Hg; density ($d_D^{25}$) =0.983 gr./cc.; and refractive index ($n_D$ at 25° C.) =1.4320.

EXAMPLE II

Preparation of:

divinyl bis (2-methoxyethoxy) silane

(Disproportionation)

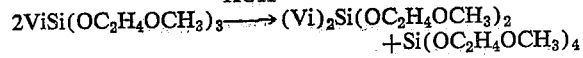

Into a 500 cc. flask connected to a fractionating column there were placed 200 grams (0.715 mole) of vinyl-tris (2-methoxyethoxy) silane [ViSi(OC$_2$H$_4$OCH$_3$)$_3$] and 1.0 gram of potassium hydroxide. The mixture was heated at the reflux temperature (150–165° C.) under a pressure of 12 mm. for seven hours during which time 38 grams of material distilling at 115–120° C. (12 mm.) was removed from the head of the column. At this point the reaction mixture was distilled rapidly at 1.0 mm. pressure. The volatile material which was collected (188.5 grams) was fractionated under reduced pressure. There was obtained, 26.2 grams (0.113 mole) of divinyl bis (2-methoxyethoxy) silane of boiling point 115–117° C. at 5.5 mm. Hg; and refractive index ($n_D$ at 25° C.) =1.4322; a conversion of 16 mole percent (32 mole percent of the vinyl-tris (2-methoxyethoxy) silane disproportionated).

In an attempt to effect a similar disproportionation of vinyltriethoxysilane for the production of divinyldiethoxysilane, 103 grams of vinyltriethoxysilane and 1.0 gram of sodium ethoxide were placed in a 500 ml. flask. The mixture was heated to reflux in a fractionating column. The kettle temperature gradually increased from 80° C. to 156° C. over a three (3) hour period. The material was then fractionated with the following results:

| | Boiling Point, °C. | Weight, gr. | Density, gr./cc. | Identity |
|---|---|---|---|---|
| 1st cut | 80–156 | 4.1 | 0.82 | |
| 2nd cut | 157 | 96.9 | | ViSi(OEt)$_3$ |
| Loss | | 2.09 | | |

The conclusion reached was that under the conditions of the experiment, no disproportionation had occurred.

Another attempt was made in a 500 ml. flask equipped with an inlet tube for purging argon through the system during reflux to prevent polymerization of the vinyltriethoxysilane. For this run, 300 grams (1.58 mole) of vinyltriethoxysilane and 1.5 grams of potassium hydroxide were placed in the flask and the flask was connected to an efficient fractionating column and the contents heated to reflux while purging with argon. With the kettle at a temperature of 165° C., the head temperature remained constant at 157° C. for several hours. The conclusion reached was that no disproportionation occurred. Although the differences in boiling points are small (below), it is believed that some indication would have been obtained in head temperature lowering, if disproportionation had occurred.

|  | °C. |
|---|---|
| ViSi(OEt)$_3$ 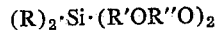 | 160.5 |
| Vi$_2$Si(OEt)$_2$ 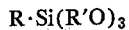 | 152 |
| Si(OEt)$_4$  | 168 |

The compound of the invention was successfully homopolymerized with peroxide catalyst to yield a cross-linked gel, thereby demonstrating its effectiveness and utility as a cross-linking agent.

Since it is considered obvious that some changes and modifications can be made in the foregoing methods and procedures without departing from the nature and spirit of our invention, it is to be understood that the invention is not to be limited to the specific details offered by way of illustration above, except as set forth in the following claims.

We claim:

1. Process for the production of divinyldialkoxyalkoxysilanes of the formulation:

$$(R)_2 \cdot Si \cdot (R'OR''O)_2$$

wherein R is a vinyl radical and R' and R'' are lower alkyl radicals, which comprises reacting a vinyltrialkoxysilane of the formulation:

$$R \cdot Si(R'O)_3$$

with a compound of the type $$R''OR'OH$$

by transesterification and disproportionation in the presence of potassium hydroxide as catalyst.

2. Process for the production of divinyl bis (2-methoxyethoxy) silane which comprises reacting vinyltriethoxysilane with methoxyethanol in the presence of a potassium hydroxide catalyst.

References Cited in the file of this patent

UNITED STATES PATENTS

| 2,559,342 | Burkhard | July 3, 1951 |
| 2,649,396 | Witt et al. | Aug. 18, 1953 |

OTHER REFERENCES

Burkhard: "Journal of Organic Chemistry," vol. 15 (1950), pp. 106–107.

Nagel et al.: "Journal of Organic Chemistry," vol. 17 (1952), pp. 1382–1385.

UNITED STATES PATENT OFFICE
Certificate of Correction

Patent No. 2,851,474                                                         September 9, 1958

Arthur N. Pines et al.

It is hereby certified that error appears in the printed specification of the above numbered patent requiring correction and that the said Letters Patent should read as corrected below.

Column 3, line 14, for "[ViCi(OEt)$_3$]" read —[ViSi(OEt)$_3$]—.

Signed and sealed this 18th day of November 1958.

[SEAL]

Attest:
KARL H. AXLINE,
*Attesting Officer.*

ROBERT C. WATSON,
*Commissioner of Patents.*